(12) United States Patent
Aoshima

(10) Patent No.: US 6,719,463 B2
(45) Date of Patent: Apr. 13, 2004

(54) DRIVE APPARATUS, LIGHT QUANTITY ADJUSTING APPARATUS, AND LENS DRIVE APPARATUS

(75) Inventor: Chikara Aoshima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/442,507

(22) Filed: May 21, 2003

(65) Prior Publication Data

US 2003/0223742 A1 Dec. 4, 2003

(30) Foreign Application Priority Data

May 28, 2002 (JP) ........................................ 2002-153730
May 12, 2003 (JP) ........................................ 2003-132597

(51) Int. Cl.$^7$ ............................................. G03B 17/00
(52) U.S. Cl. ...................... 396/463; 310/46; 310/156.38
(58) Field of Search ................................ 396/463, 493; 310/46, 47, 261, 156.01, 156.38

(56) References Cited

U.S. PATENT DOCUMENTS 5,831,356 A  * 11/1998 Aoshima ................... 310/49 R
6,565,270 B2 *  5/2003 Naganuma ................. 396/454

* cited by examiner

*Primary Examiner*—David M. Gray
(74) *Attorney, Agent, or Firm*—Robin, Blecker & Daley

(57) ABSTRACT

A feature of the present invention resides in that when a value of a ratio of a central angle of an outer magnetic pole portion to a central angle of each magnetized pole of a magnet portion is referred to as Y, and a value of a ratio of a thickness of the magnet portion in a diameter direction to a circumferential length of each magnetized pole of the magnet portion is referred to as X, the following condition is satisfied:

$$-0.3X + 0.63 > Y.$$

11 Claims, 11 Drawing Sheets

FIG. 7

|   | MAXIMUM DIAMETER OF STATOR | EXTERNAL DIAMETER OF MAGNET | NUMBER OF MAGNETIC POLES | THICKNESS OF MAGNET |
|---|---|---|---|---|
| 1 | φ6mm | φ4.8mm | 10 POLE | 0.5mm |
| 2 | φ10.9 | φ10 | 20 POLE | 0.5mm |
| 3 | φ11.5 | φ10.6 | 20 POLE | 0.5mm |
| 4 | φ11.9 | φ11 | 20 POLE | 0.5mm |
| 5 | φ11.9 | φ11 | 20 POLE | 0.3mm |
| 6 | φ11.9 | φ11 | 20 POLE | 0.6mm |
| 7 | φ11.9 | φ11 | 12 POLE | 0.5mm |
| 8 | φ11.9 | φ11 | 24 POLE | 0.5mm |
| 9 | φ12.9 | φ12 | 20 POLE | 0.5mm |

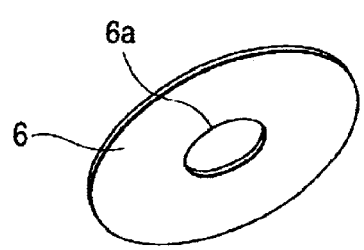
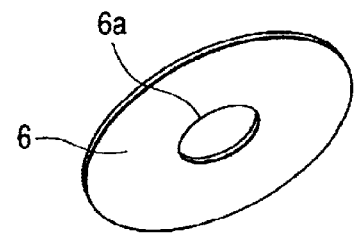

DRIVE APPARATUS, LIGHT QUANTITY ADJUSTING APPARATUS, AND LENS DRIVE APPARATUS

BACKGROUND OF THE INVENTION

1. Field of the Invention

The present invention relates to an improvement of a drive apparatus and a light quantity adjusting apparatus that are suited for a shutter apparatus or the like used in an image pickup apparatus such as a digital camera. The present invention also relates to an improvement of a lens drive apparatus suited to driving a lens of an image pickup apparatus.

2. Related Background Art

A conventional shutter apparatus for use in a lens shutter camera is shown in FIG. 16. In this drawing, reference numeral 101 denotes a magnet that is a permanent magnet, numeral 102 a drive lever, and numeral 102a a drive pin provided for the drive lever 102. This drive lever 102 is fixed to the magnet 101 and rotates integrally with the magnet 101. Reference numeral 103 represents a coil and reference numerals 104 and 105 each indicate a stator that is made of a soft magnetic material and is to be excited by the coil 103. The stator 104 and the stator 105 are connected to each other through portions 104a and 105a and are integrated with each other in terms of a magnetic circuit. When the coil 103 is energized, the stator 104 and the stator 105 are excited and the magnet 101 is driven to rotate within a predetermined angle. Reference numerals 106 and 107 each denote a shutter blade and reference numeral 108 indicates a ground board. The shutter blades 106 and 107 are rotatively attached to pins 108b and 108c of the ground board 108 through hole portions 106a and 107a, with the drive pin 102a being slidably fitted into long holes 106b and 107b of the shutter blades 106 and 107. With this construction, the drive lever 102 rotates along with the magnet 101, the shutter blades 106 and 107 are driven to rotate about the hole portions 106a and 107a, and an opening portion 108a of the ground board is opened/closed. In order to prevent an increase in cost, the magnet is formed using a plastic magnet and the drive pin is formed in an integrated manner.

Reference numeral 109 denotes a front ground board that holds the shutter blades 106 and 107 so as to be movable in a gap between this front ground board 109 and the ground board 108, while reference numeral 110 indicates a rear ground board that holds the stators 104 and 105 and rotatively holds the magnet 101.

By the way, digital cameras are now in widespread use which each photoelectrically convert the image of an objective field using a CCD or the like as an image pickup element and records the image in a storage medium as information of a still image. An example of an exposure operation performed by a digital camera of this type will be briefly described below.

First, the main power supply is turned on prior to photographing and, when an image pickup element is placed in an operable state, shutter blades are maintained at an open position at which exposure of the image pickup element is enabled. Under this condition, the image pickup element repeatedly accumulates, discharges, and transfers electric charges, which makes it possible to observe the objective field using an image monitor.

Following this, when a release button is depressed, a diaphragm value and an exposure time are determined in accordance with an output of the image pickup element at this point in time. When it is judged from the determined diaphragm value and exposure time that the diameter of an exposure aperture needs to be reduced, a diaphragm blade is first driven to a position at which a predetermined diaphragm value is obtained. Next, the image pickup element, from which accumulated electric charges have been discharged, is caused to start accumulation of electric charges. At the same time, an exposure time control circuit is activated in response to the accumulation start signal serving as a trigger signal. Then, when a predetermined exposure time has passed, the shutter blades are driven to a close position at which the exposure light to the image pickup element is blocked. After the exposure light is blocked, the accumulated electric charges are transferred and image information is recorded in a recording medium through an image writing apparatus. The exposure of the image pickup element is inhibited during the transfer of the electric charges because it is required to prevent a situation where the electric charges are changed by extra light during this electric charge transfer.

Aside from the shutter apparatus described above, there are also available a shutter apparatus having a mechanism of moving an ND filter and a shutter apparatus having a mechanism of moving a diaphragm regulating member having a small diaphragm diameter.

With these shutter apparatuses, it becomes possible to realize thickness reduction, although a large area of a ground board is occupied by a coil and a stator. In view of this problem, there is proposed a light quantity adjusting apparatus shown in FIG. 17.

In this drawing, reference numeral 201 denotes a tubular rotor, with its portion 201a being magnetized to have the N pole and its portion 201b being magnetized to have the S pole. Reference numeral 201c represents an arm formed integrally with the rotor 201, and reference numeral 201d indicates a drive pin extending from this arm 201c in a rotation axis direction of the rotor 201. Reference numeral 202 indicates a coil that is disposed in the axis direction of the rotor 201. Reference numeral 203 denotes a stator that is made of a soft magnetic material and is to be excited by the coil 202. This stator 203 includes an outer magnetic pole portion 203a opposing the outer peripheral surface of the rotor 201 and an inner cylinder inserted into the rotor 201. Reference numeral 204 indicates an auxiliary stator that is fixed to the inner cylinder of the stator 203 and opposes the inner peripheral surface of the rotor 201. When the coil 202 is energized, the outer magnetic pole portion 203a and the auxiliary stator 204 are excited and the rotor 201 rotates to a predetermined position. Reference numerals 207 and 208 each represent a shutter blade, while reference numeral 205 indicates a ground board. The shutter blades 207 and 208 are rotatively attached to pins 205b and 205c of the ground board 205 through hole portions 207a and 208a, with the drive pin 201d being slidably fitted into long holes 207b and 208b. Reference numeral 206 denotes a torsion spring that gives an elastic force to the rotor 201 so that the drive pin 201d is pressed against end portions of the long holes 207b and 208b. When the coil 202 is energized, the drive pin 201d rotates along with the rotor 201 in defiance of the elastic force given by the torsion spring 206, so that the shutter blades 207 and 208 are driven to rotate about the hole portions 207a and 208a and an opening portion 5a of the ground board is opened/closed.

With such a construction, it becomes possible to construct a compact light quantity adjusting apparatus.

The light quantity adjusting apparatus shown in FIG. 17 has a shape suited for miniaturization, in comparison with the apparatus shown in FIG. 16. However, the energization needs to be continued when it is desired to move the shutter blades to a close position in defiance of the elastic force given by the torsion spring and to maintain the shutter blades at the close position. Also, in order to maintain the shutter blades at the open position and the close position without using the torsion spring, there may be utilized the direction of energization of the coil. Even in this case, however, in order to maintain the drive target member at a position at which this member is abutted against an end portion of the long hole of the ground board, it is required to continue the energization of the coil. Accordingly, there still remains room for improvement by which power saving is achieved.

SUMMARY OF THE INVENTION

According to one aspect of the present invention, a drive apparatus for maintaining a rotor at two stoppage positions includes: a magnet portion having a cylindrical shape whose outer peripheral surface is circumferentially divided into sections that are magnetized to have different poles; a rotor that is capable of rotating about an axis; at least one outer magnetic pole portion that is formed so as to protrude and extend parallel to the axis and opposes the outer peripheral surface of the magnet portion; an inner magnetic pole portion disposed at a position opposing the outer magnetic pole portion so as to oppose an inner peripheral surface of the magnet portion; and a coil that is disposed in an axis direction of the rotor and excites the outer magnetic pole portion and the inner magnetic pole portion. In the drive apparatus, when a value of a ratio of a central angle of the outer magnetic pole portion to a central angle of each magnetized pole of the magnet portion is referred to as Y, and a value of a ratio of a thickness of the magnet portion in a diameter direction to a circumferential length of each magnetized pole of the magnet portion is referred to as X, the following condition is satisfied:

$$-0.3X+0.63>Y.$$

According to another aspect of the invention, a light quantity adjusting apparatus for maintaining a light quantity adjusting member at two stoppage positions includes: a magnet portion having a cylindrical shape whose outer peripheral surface is circumferentially divided into sections that are magnetized to have different poles; a rotor that is capable of rotating about an axis; an output member that operates in accordance with rotation of the rotor; at least one outer magnetic pole portion that is formed so as to protrude and extend parallel to the axis and opposes the outer peripheral surface of the magnet portion; an inner magnetic pole portion disposed at a position opposing the outer magnetic pole portion so as to oppose an inner peripheral surface of the magnet portion; a coil that is disposed in an axis direction of the rotor and excites the outer magnetic pole portion and the inner magnetic pole portion; a ground board provided with an opening portion; and a light quantity adjusting member that is driven by the output member so as to move between a position closing the opening portion of the ground board and a position away from the opening portion, and changes a light quantity passing through the opening portion. In the light quantity adjusting apparatus, when a value of a ratio of a central angle of the outer magnetic pole portion to a central angle of each magnetized pole of the magnet portion is referred to as Y, and a value of a ratio of a thickness of the magnet portion in a diameter direction to a circumferential length of each magnetized pole of the magnet portion is referred to as X, the following condition is satisfied:

$$-0.3X+0.63>Y.$$

According to yet another aspect of the present invention, a lens drive apparatus for maintaining a lens at two stoppage positions includes: a magnet portion having a cylindrical shape whose outer peripheral surface is circumferentially divided into sections that are magnetized to have different poles; a rotor that is capable of rotating about an axis; an output member that operates in accordance with rotation of the rotor; at least one outer magnetic pole portion that is formed so as to protrude and extend parallel to the axis and opposes the outer peripheral surface of the magnet portion; an inner magnetic pole portion disposed at a position opposing the outer magnetic pole portion so as to oppose an inner peripheral surface of the magnet portion; a coil that is disposed in an axis direction of the rotor and excites the outer magnetic pole portion and the inner magnetic pole portion; a ground board provided with an opening portion; and a lens that is driven by the output member so as to move between a position closing the opening portion of the ground board and a position away from the opening portion, and changes a focal length of a luminous flux passing through the opening portion. In the lens drive apparatus, when a value of a ratio of a central angle of the outer magnetic pole portion to a central angle of each magnetized pole of the magnet portion is referred to as Y, and a value of a ratio of a thickness of the magnet portion in a diameter direction to a circumferential length of each magnetized pole of the magnet portion is referred to as X, the following condition is satisfied:

$$-0.3X+0.63>Y.$$

With these constructions, the rotor is stably maintained at predetermined two positions by a magnetic force acting between the magnet portion and the outer magnetic pole portion. Once the coil is energized and the rotor is rotated to either of the two positions, even if the energization of the coil is terminated, the rotor is maintained at the rotation position, which makes it possible to perform setting of the rotor at the two positions with less power consumption.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 7 shows dimensions of each motor used in order to obtain the relations in FIG. 6;

DESCRIPTION OF THE PREFERRED EMBODIMENTS

The present invention will now be described in detail with reference to the drawings showing embodiments thereof.
(First Embodiment)

Figure 1:
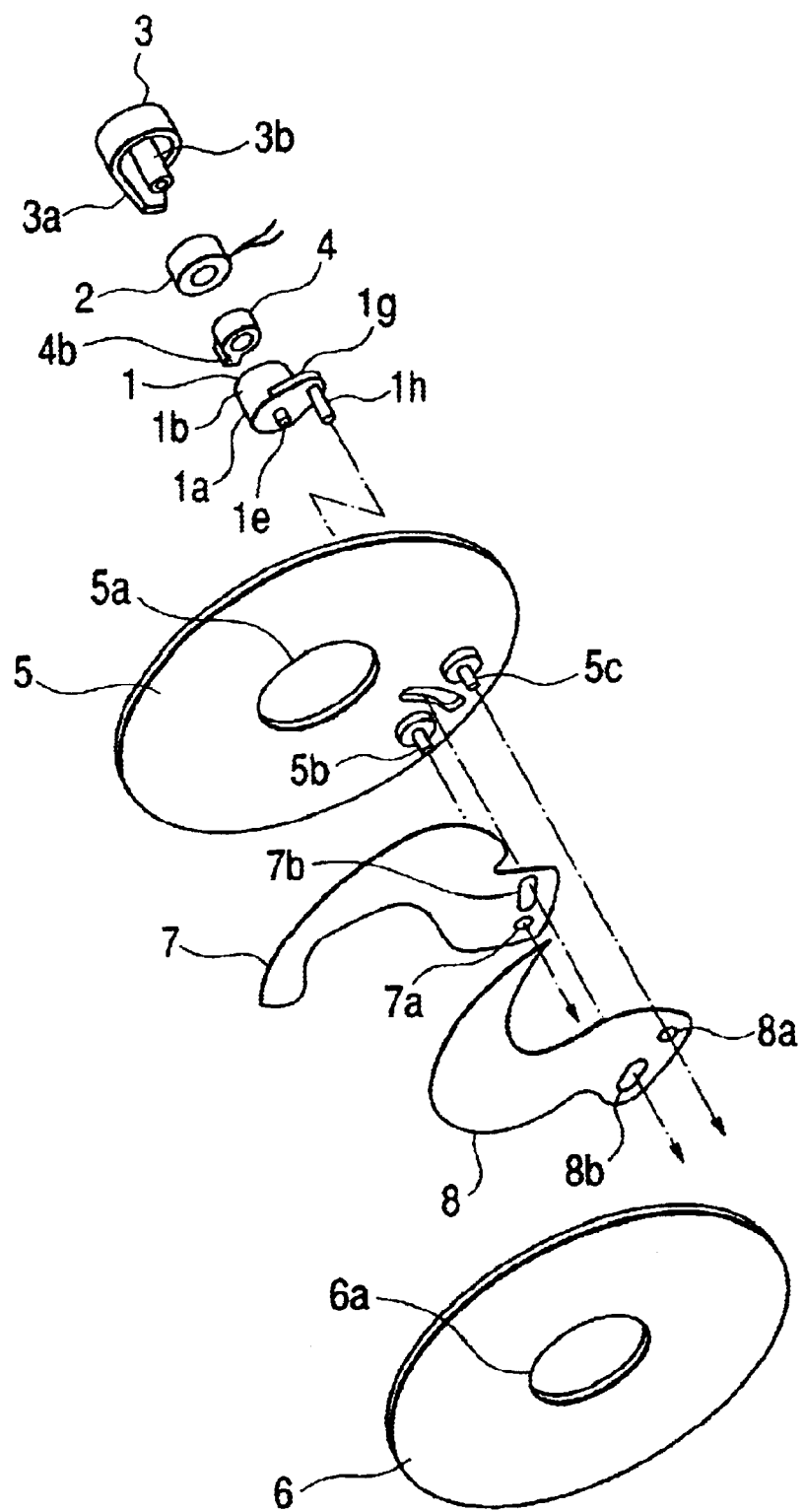
FIG. 1 is a disassembled perspective view of a light quantity adjusting apparatus according to a first embodiment of the present invention.
Figure 2:
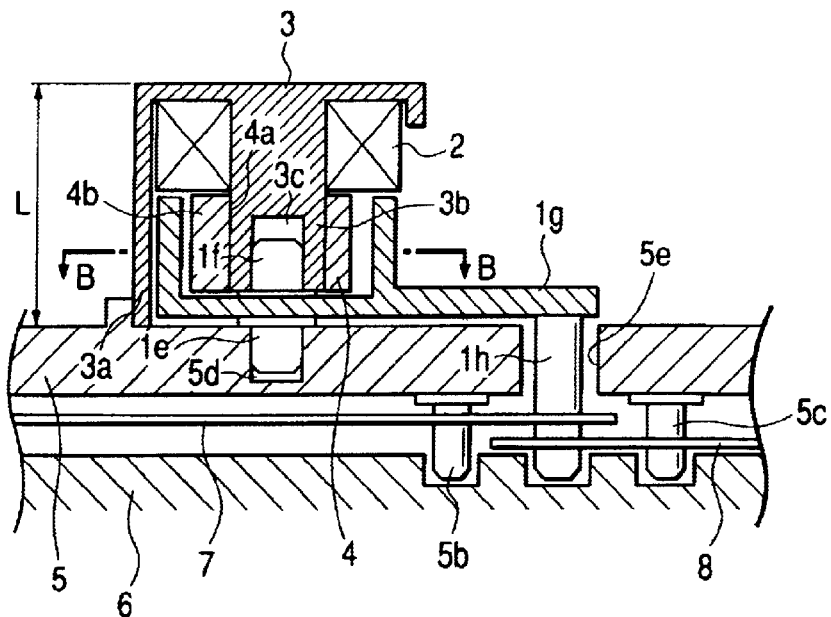
FIG. 2 is a cross-sectional view of the light quantity adjusting apparatus in FIG. 1.
Figure 3:
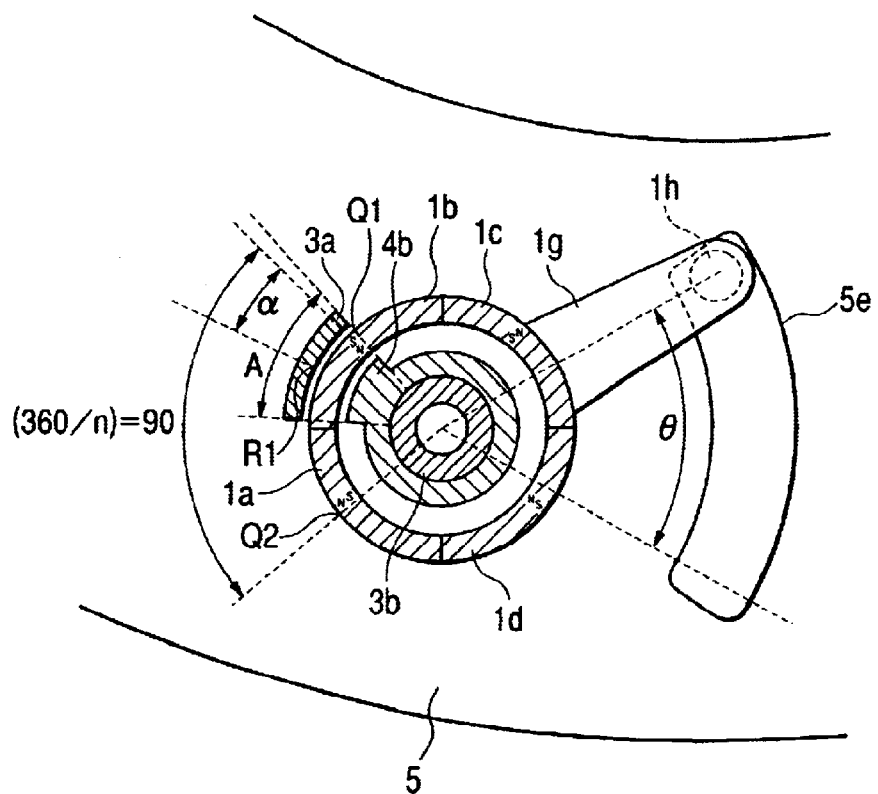
FIG. 3 is a cross-sectional view taken along the line B—B in FIG. 2 under a state where a shutter is closed in the first embodiment of the present invention.
Figure 4:
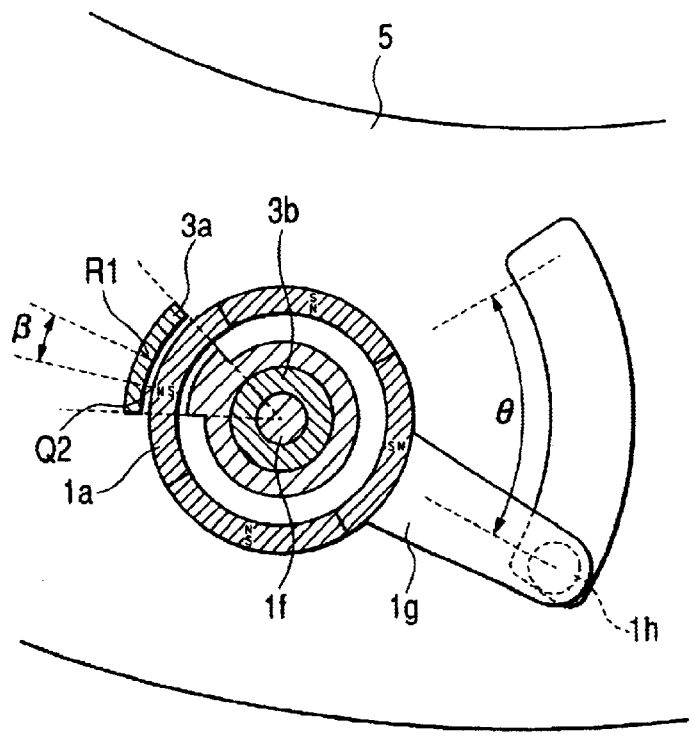
FIG. 4 is a cross-sectional view taken along the B—B in FIG. 2 under a state where the shutter is opened in the first embodiment of the present invention.

FIGS. 1 to 4 each show a light quantity adjusting apparatus according to a first embodiment of the present invention, with FIG. 1 being a disassembled perspective view of a shutter blade drive mechanism possessed by the light quantity adjusting apparatus, FIG. 2 being a cross-sectional view thereof, FIG. 3 being a cross-sectional view taken along the line B—B in FIG. 2 under a state where a shutter is closed, and FIG. 4 being a cross-sectional view taken along the line B—B in FIG. 2 under a state where the shutter is opened.

In these drawings, reference numeral 1 denotes a rotor that is made of a plastic magnet material and has a magnet portion having an approximately cylindrical shape. The outer peripheral surface of the magnet portion is circumferentially divided into four sections that are alternately magnetized to have the S pole and the N pole. To be more specific, as shown in FIG. 3, the outer peripheral surfaces of magnetized portions 1a and 1c are magnetized to have the N pole, while the outer peripheral surfaces of magnetized portions 1b and 1d are magnetized to have the S pole. In this first embodiment, the number of magnetic poles is set at four, although it is sufficient that there exist at least two magnetic poles. Reference numeral 2 represents a coil having a cylindrical shape. This coil 2 is concentric with the rotor 1 and is disposed at a position adjacent to the rotor 1 in an axis direction of the rotor 1. Also, the external diameter of the coil 2 is approximately equal to the external diameter of the magnet portion of the rotor 1.

Reference numeral 3 indicates a stator that is made of a soft magnetic material and includes an outer cylinder, which has a tip portion formed as a tooth-shaped outer magnetic pole portion 3a, and an inner cylinder 3b having a column shape. The outer magnetic pole portion 3a is formed so as to extend like a plate in a direction parallel to the rotation axis of the magnet 1 from the outer cylinder of the stator 3, and is constructed so as to oppose a part of the outer peripheral surface of the rotor 1 with a predetermined gap in-between, with the opposed part of the outer peripheral surface of the rotor 1 having a size corresponding to a predetermined angle (see FIG. 3). Here, this angle refers to the central angle of a fan-shaped area formed by the outer magnetic pole portion 3a and the rotation center position of the magnet. The predetermined angle in this first embodiment will be described in detail later. Reference numeral 4 denotes an auxiliary stator, with the inner cylinder 3b of the stator 3 being fitted into and fixed to an internal diameter portion 4a of this auxiliary stator 4 (see FIG. 2). Also, in the external diameter portion of the auxiliary stator 4, there is formed an opposing portion 4b in a phase opposing the outer magnetic pole portion 3a of the stator 3, as shown in FIG. 3.

The column-shaped inner cylinder 3b of the stator 3 and the auxiliary stator 4 constitute an inner magnetic pole portion. The opposing portion 4b of this inner magnetic pole portion is formed as a protrusion extending toward the outer magnetic pole portion 3a. However, this inner magnetic pole portion may have a simple cylindrical shape or may be formed only with the inner cylinder 3b. However, it is preferable that the opposing portion 4b shown in FIG. 3 is provided because rotation torque of the rotor 1 becomes large in comparison with a case where the opposing portion 4b is not provided.

The rotor 1 is provided with an arm 1g that is integrally formed at a position at which this arm 1g does not oppose the outer magnetic pole portion 3a. Also, a drive pin 1h that is an output member of the rotor is formed at the tip of the arm 1g. Further, the drive pin 1h is disposed so as to move in a direction in which this drive pin approaches or departs from the center of an opening portion 5a of a ground board 5 to be described later, that is, in an approximately radius direction of the ground board 5 while being guided by a guide groove 5e.

Reference numeral 5 indicates the ground board of the light quantity adjusting apparatus, with this ground board 5 including the opening portion 5a. As shown in FIG. 2, the rotor 1 is attached so that its axis portion 1e is rotatively fitted into a concave portion 5d of the ground board 5 and its axis portion 1f is rotatively fitted into a hole 3c formed at the tip of the inner magnetic pole portion of the stator 3. The outer magnetic pole portion 3a of the stator 3 is fixed to the ground board 5 and the axis portion 1f of the rotor 1 is rotatively fitted into the hole 3c, which makes it possible to perform production while extremely reducing gap errors occurring between the rotor 1 and the inner magnetic pole portion and between the rotor 1 and the outer magnetic pole portion due to stacking of the components. As a result, there is stabilized performance at the time of mass production.

The coil 2 is disposed at a position adjacent to the rotor 1 in the axis direction. Also, the rotor 1 is disposed so that its rotation center position exists outside of the opening portion 5a of the ground board 5 (the axis 1e exists at the position of the concave portion 5d) and the direction of its rotation axis is parallel to the optical axis of the opening portion 5a.

Reference numeral 6 denotes a ground board that is provided so that a predetermined gap is maintained between this ground board 6 and the ground board 5, with shutter blades 7 and 8 for light quantity adjustment (to be described later) being movably held in this gap. Also, the ground board 6 includes an opening portion 6a. Reference numerals 7 and 8 each indicate the shutter blade that functions as a light quantity adjusting member, with pins 5b and 5c of the ground board 5 being rotatively fitted into holes 7a and 8a of these shutter blades, respectively. Also, these shutter blades are provided with long holes 7b and 8b into which the drive pin 1h of the rotor 1 is slidably fitted. With this construction, the shutter blades 7 and 8 are driven so as to change the opening amount of the opening portion 5a of the ground board 5 in accordance with rotation of the rotor 1.

When the rotor 1 is set at a rotation position shown in FIG. 3, the opening 5a is closed by the shutter blades 7 and 8. On the other hand, when the rotor 1 is set at a rotation position shown in FIG. 4, the shutter blades 7 and 8 are positioned away from the opening portion 5a and therefore the opening portion 5a is placed in an open state.

When energization of the coil 2 is started under the state shown in FIG. 3, the outer magnetic pole portion 3a of the stator 3 is excited in the S pole and the auxiliary stator 4 that is a part of the inner magnetic pole portion is exited in the N pole. Consequently, the rotor 1 rotates in a clockwise direction and there is obtained the state shown in FIG. 4 in which the opening portion 5a is opened. When the coil 2 is energized in a reverse direction under the state shown in FIG. 4, the outer magnetic pole portion 3a of the stator 3 is excited in the N pole and the auxiliary stator 4 that is a part of the inner magnetic pole portion is excited in the S pole. Consequently, the rotor 1 rotates in a counterclockwise direction in FIG. 4 and there is obtained the state shown in FIG. 3 in which the opening portion 5a is closed. By switching the direction of the energization of the coil 2 in this manner, the drive pin 1h reciprocates between the position shown in FIG. 3 and the position shown in FIG. 4.

The drive pin 1h provided for the rotor 1 is disposed on a side opposite to the outer magnetic pole portion 3a with the rotor 1 in-between, and is separated from the outer magnetic pole portion 3a. As a result, even if the drive pin 1h is produced using a magnetic material and is magnetized, the electromagnetic force occurring in the drive pin 1h is extremely small and therefore exerts almost no influence on the overall output characteristic of the magnet. As a result, it becomes possible to obtain a drive apparatus having a stable operating characteristic.

Also, the drive pin 1h is formed integrally with the rotor 1 made of a plastic magnet material, so that it becomes possible to reduce assembling errors at low cost, in comparison with a case where the drive pin 1h is produced as a separated component. Also, the outer magnetic pole portion 3a and the arm 1g having the drive pin 1h are positioned so as to overlap each other in the axis direction of the rotor 1, so that it also becomes possible to suppress a length L (see FIG. 2) of the present drive apparatus having the approximately cylindrical shape in the axis direction.

Further, the outer magnetic pole portion 3a of the stator 3 is produced in a tooth shape (or a comb-tooth shape when a plurality of outer magnetic pole portions are provided) so as to protrude and extend in a direction parallel to the axis direction of the rotor 1. Therefore, it becomes possible to suppress the diameter of the stator 3 to the minimum size where the magnetic gap and the thickness of the stator 3 are added to the diameter of the magnet portion of the rotor 1. As a result, there is realized a drive apparatus having an extremely small diameter.

With the above construction, the coil 2 is disposed in the axis direction of the rotor 1, so that even the largest width of this drive apparatus is reduced to a width where the length of the arm 1g is added to the diameter of the stator 3. As a result, as is apparent from FIG. 3, the area of the ground board 5 occupied by each component becomes extremely small, which realizes a compact drive apparatus.

Also, there is obtained a magnetic path in which the rotor 1 is sandwiched between the outer magnetic pole portion opposing the outer peripheral surface of the rotor 1 and the inner magnetic pole portion opposing the inner peripheral surface of the rotor 1, which makes it possible to construct a magnetic path having small magnetic resistance. In addition, when the coil 2 is energized, lines of magnetic force emerging from the magnetic pole portion on one side flow to the magnetic pole portion on the other side, so that many of the lines of magnetic force act on the rotor 1 sandwiched between these magnetic pole portions. As a result, there is realized a drive apparatus having a high rotation output, which eventually leads to realization of a compact drive apparatus with ease. Also, it is sufficient that only one coil 2 is used, so that a circuit for controlling the energization becomes simple, which makes it possible to realize a construction where cost reduction is achieved.

Next, the shape of the outer magnetic pole portion 3a will be described in detail.

When the coil 2 is not energized, the rotation position of the rotor 1 is not changed and there is maintained a state where the shutter is opened/closed. This point will be described with reference to FIGS. 5 and 6.

Figure 5:
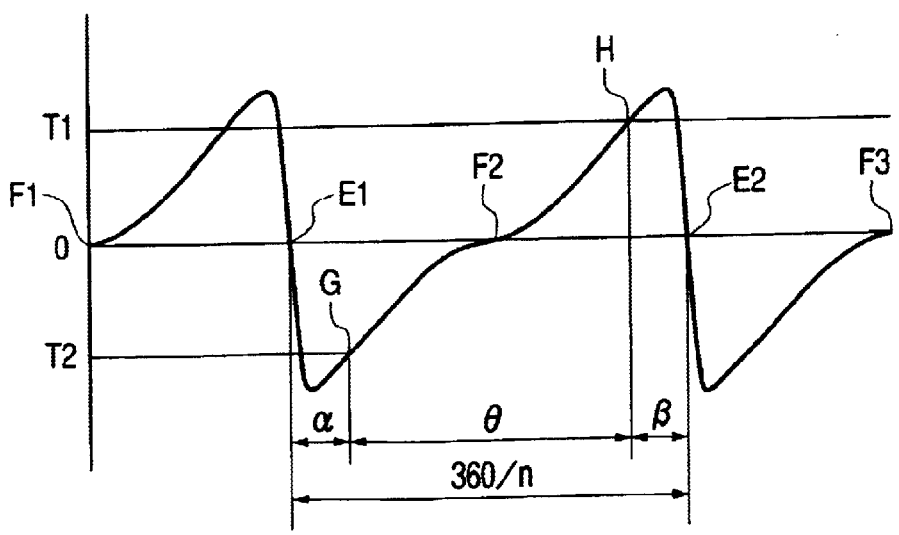
FIG. 5 shows how cogging torque changes in the first embodiment of the present invention.

In FIG. 5, the vertical axis represents a magnetic force that is generated between the outer magnetic pole portion and the inner magnetic pole portion and acts on the rotor 1, while the horizontal axis represents the rotation phase of the rotor 1.

At positions designated by points E1 and E2, when the rotor 1 attempts to rotate in a forward direction, a force is exerted in a reverse direction and the rotor 1 is returned to its original position. On the other hand, when the rotor 1 attempts to rotate in the reverse direction, a force is exerted in the forward direction and the rotor 1 is returned to the original position. That is, these points E1 and E2 are each a cogging position at which the rotor 1 is positioned with stability as a result of a magnetic force between the magnet and the outer magnetic pole portion. Positions designated by points F1, F2, and F3 are each a stoppage position at which the rotor 1 is placed under an unstable equilibrium state in which when the phase of the magnet is shifted even slightly, there is exerted a force for rotating the rotor 1 to the position designated by their preceding or succeeding point E1 or E2. Under a state where the coil 2 is not energized, the rotor 1 does not stop at the positions of the points F1, F2, and F3 in defiance of a vibration or a change in posture and always stops at the position of the point E1 or E2.

When the number of magnetic poles of the magnet is referred to as NA, the stable cogging points, such as the points E1 and E2, exist at intervals of $(360/NA)°$ and each intermediate position therebetween becomes an unstable point such as the points F1, F2, and F3.

As a result of numerical simulation conducted using a finite element method, it has become apparent that the attracting state of the outer magnetic pole portion and the magnet during non-energization of the coil varies depending on a relation between the angle of each magnetized pole of the magnet (central angle of each magnetized portion of the magnet) and an opposing angle of the outer magnetic pole portion with reference to the magnet (the central angle of the fan-shaped area formed by the outer magnetic pole portion 3a and the rotation center position of the magnet (designated by a reference symbol A in FIG. 3)).

According to the numerical simulation, the cogging position of the magnet varies depending on the opposing angle of the outer magnetic pole portion with reference to the magnet. That is, when the opposing angle of the outer magnetic pole portion with reference to the magnet is equal to or less than a predetermined value, the center of a pole of the magnet is stably maintained at a position opposing the center of the outer magnetic pole portion. That is, there is obtained a state corresponding to the point E1 or E2 shown in FIG. 5. Conversely, when the opposing angle of the outer magnetic pole portion with reference to the magnet exceeds the predetermined value, a boundary between the poles of the magnet is stably maintained at the position opposing the center of the outer magnetic pole portion, with this position corresponding to the point E1 or E2 shown in FIG. 5. This state will be described below with reference to FIG. 6.

Figure 6:
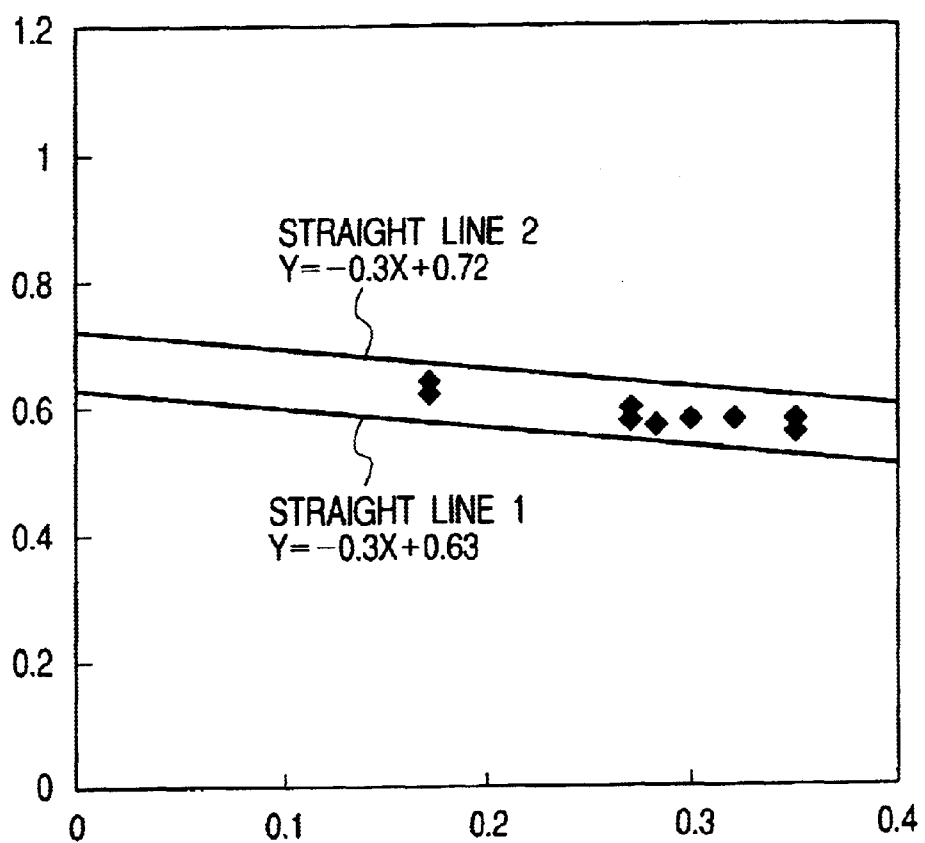
FIG. 6 shows relations among the width of an outside magnetic pole, the cogging torque, and the size of a magnet in the first embodiment of the present invention.

FIG. 6 shows relations among the width of the outer magnetic pole portion, the cogging torque, and the size of the magnet.

In FIG. 6, the horizontal axis represents "the thickness of the magnet/the outer peripheral length of each pole of the rotor", while the vertical axis indicates "the opposing angle of each outer magnetic pole portion with reference to the magnet/the angle of each pole of the rotor (in other words, the central angle of each outer magnetic pole portion/the central angle of each pole of the magnet)".

When the external diameter and internal diameter of the magnet are respectively set at 10 mm and 9 mm and the number of poles thereof is set at "16", for instance, the thickness of the magnet becomes "(10−9)/2)" and the outer peripheral length of each magnetized pole becomes "10×π/16", so that "the thickness of the magnet/the outer peripheral length of each pole of the rotor" represented by the horizontal axis becomes "0.255". Also, the angle of each pole of the rotor becomes "22.5°", so that when the opposing angle of each outer magnetic pole portion with reference to the magnet is set at "13°", "the opposing angle of each outer magnetic pole portion with reference to the magnet/the angle of each pole of the rotor" represented by the vertical axis becomes "0.578".

Each point in FIG. 6 is obtained by plotting "the opposing angle of each outer magnetic pole portion with reference to the magnet/the angle of each pole of the rotor" and "the thickness of the magnet/the outer peripheral length of each pole of the rotor" of each motor at the time when the cogging torque becomes around "0" or the minimum, with data concerning nine kinds of motors shown in FIG. 7 being graphed.

In FIG. 6, when it is assumed that the vertical axis represents "Y=the opposing angle of each outer magnetic pole portion with reference to the magnet/the angle of each pole of the rotor" and the horizontal axis indicates "X=the thickness of the magnet/the outer peripheral length of each pole of the rotor", the plotted points exist in a region sandwiched between a straight line 1 obtained through approximation using an expression of "Y=−0.3X+0.63" and a straight line 2 obtained through approximation using an expression of "Y=−0.3X+0.72".

In the range below the straight line 1 in this drawing, that is, in the range of "Y<−0.3X+0.63", the center of a pole of the magnet is stably maintained at the position opposing the center of the outer magnetic pole portion. On the other hand, in the range of "Y>−0.3Y+0.72", a boundary between the poles of the magnet is stably maintained at the position opposing the center of the outer magnetic pole portion.

In the region sandwiched between the straight lines 1 and 2, that is, when a condition of "−0.3X+0.63≦Y≦−0.3X+0.72" is satisfied, there is realized a construction where the cogging torque becomes extremely small.

Here, when the opposing angle A of the outer magnetic pole portion 3a with reference to the magnet gradually changes depending on the position in the axis direction of the magnet, it is sufficient that an average opposing angle satisfies the conditional expressions described above. That is, when the opposing angle A in the vicinity of an end surface portion of the magnet is "15°" and the opposing angle A in the vicinity of the tip portion of the outer magnetic pole portion is around "13°", for instance, it is sufficient that an angle of "14°" that is a mean value thereof is applied to the conditional expressions described above.

Figure 8:
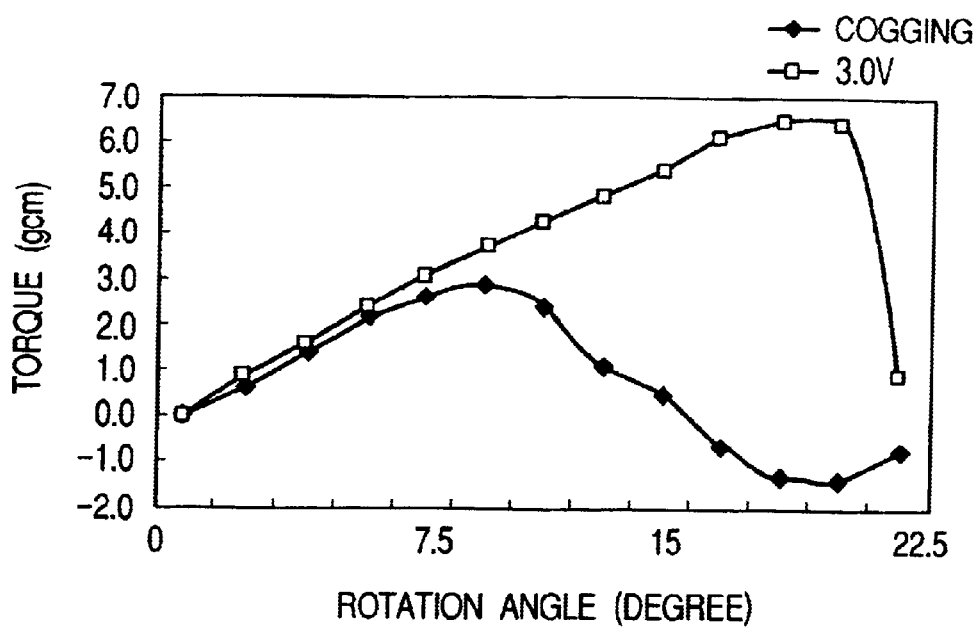
FIG. 8 shows a relation between torque and a rotation phase of the rotor, with the relation being obtained by conducting an experiment in the first embodiment of the present invention.
Figure 9:
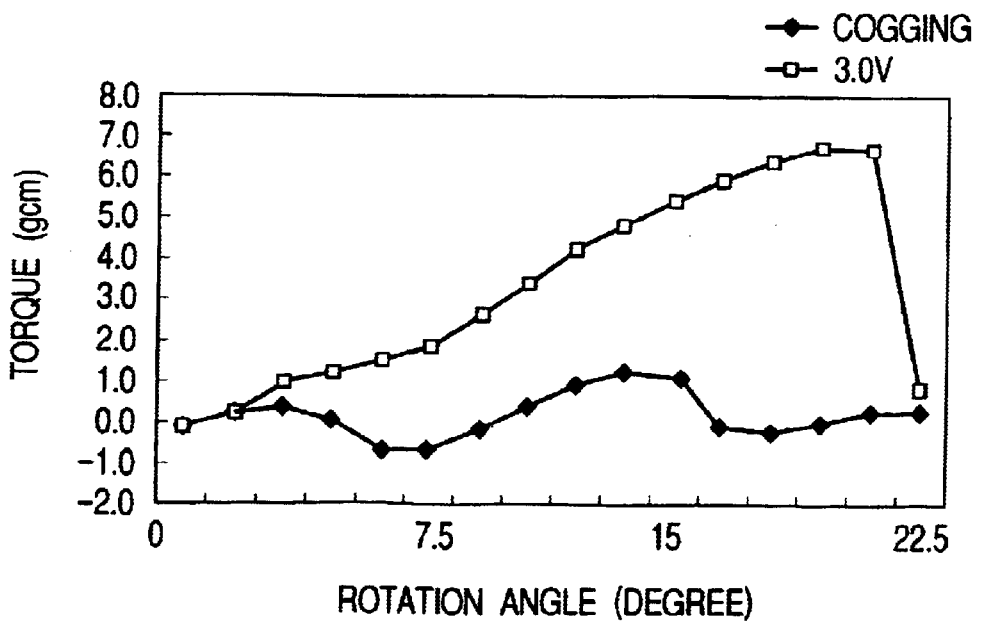
FIG. 9 shows another relation between the torque and the rotation phase of the rotor, with the relation being obtained by conducting another experiment in the first embodiment of the present invention.
Figure 10:
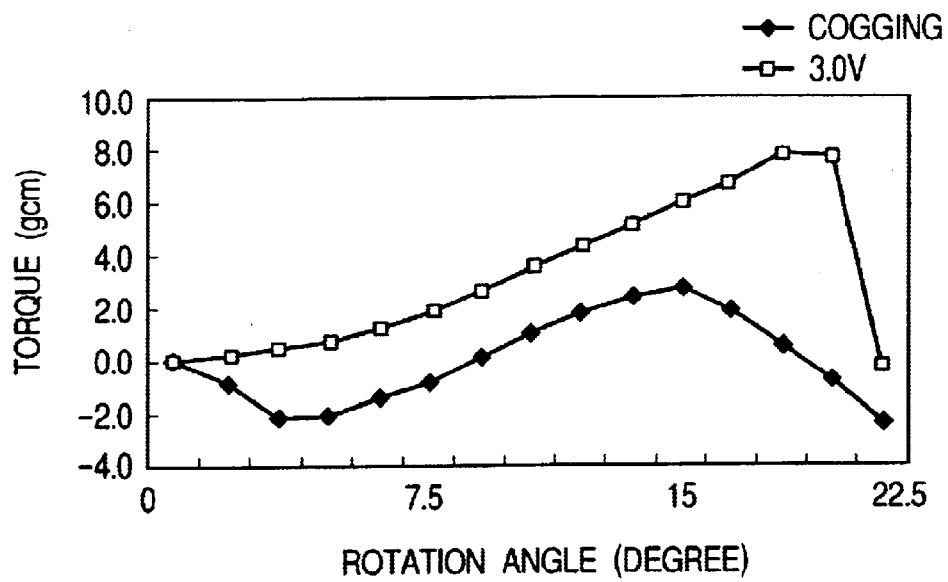
FIG. 10 shows still another relation between the torque and the rotation phase of the rotor, with the relation being obtained by conducting still another experiment in the first embodiment of the present invention.

Experimental results are shown in FIGS. 8, 9, and 10.

Like in FIG. 5, in each of FIGS. 8, 9, and 10, the vertical axis represents a torque resulting from a magnetic force that is generated by the outer magnetic pole portion and the inner magnetic pole portion and acts on the rotor 1, while the horizontal axis indicates the rotation phase of the rotor 1. In these drawings, there are shown two kinds of torque that are torque at the time when the coil is not energized (that is, the cogging torque) and torque generated when a voltage of "3 V" is applied between coil terminals.

A model motor used to obtain data in these drawings is constructed as follows.

(1) The magnet has an external diameter of Φ10.6 mm, an internal diameter of Φ09.8 mm, and magnetic poles whose number is 16.
(2) The coil has the number of turns of 112 and a resistance of 10 Ω.
(3) The outer magnetic pole portion of the stator has an external diameter of Φ11.6 mm and an internal diameter of Φ11.1 mm.
(4) The inner magnetic pole portion of the stator has an external diameter of Φ9.3 mm and an internal diameter of Φ8.8 mm.

The shape of this motor is the same as those shown in FIGS. 1 to 4.

In FIG. 8, the opposing angle A of each outer magnetic pole portion with reference to the magnet is set at "10.35°" and "X" and "Y" become "0.192" and "0.46", respectively.

In FIG. 9, the opposing angle A of each outer magnetic pole portion with reference to the magnet is "13.45°" and "X" and "Y" become "0.192" and "0.60", respectively. In this case, the torque generated at the time of non-energization, that is, the cogging torque becomes the smallest.

In FIG. 10, the opposing angle A of each outer magnetic pole portion with reference to the magnet is 15.52° and "X" and "Y" become "0.192" and "0.69", respectively.

Figure 11:
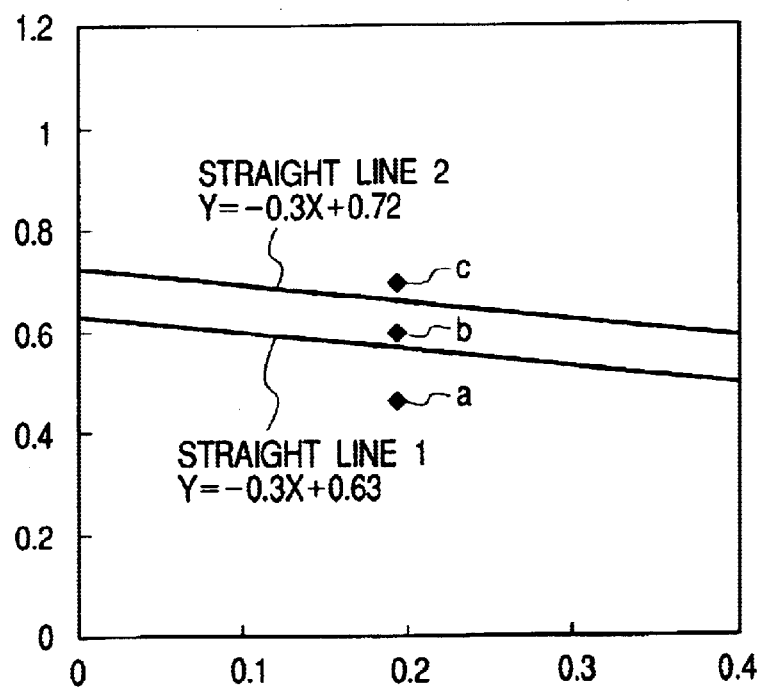
FIG. 11 shows relations among the width of an outside magnetic pole, cogging torque, and the size of a magnet of each experiment model used in the first embodiment of the present invention.

The constructions having characteristics shown in FIGS. 8, 9, and 10 described above are respectively designated using reference symbols "a", "b", and "c" in FIG. 11 in which there are shown the straight lines obtained in FIG. 6.

In the case of the construction whose characteristic is shown in FIG. 8, that is, in the case of the construction where the opposing angle A of each outer magnetic pole portion with reference to the magnet is "10.35°", "X" becomes "0.192" and "Y" becomes "0.46", as described above. Therefore, this construction satisfies the condition of "Y<−0.3X+0.63" and the stable position of the magnet exists at a position at which the center of a pole of the magnetic pole portion opposes the center of the outer magnetic pole portion.

In the case of the construction whose characteristic is shown in FIG. 9, that is, in the case of the construction where the opposing angle A of each outer magnetic pole portion with reference to the magnet is "13.45°", "X" becomes "0.192" and "Y" becomes "0.60", as described above. Therefore, this construction satisfies the condition of "−0.3X+0.63≦Y≦−0.3X+0.72" and the cogging torque becomes extremely small.

In the case of the construction whose characteristic is shown in FIG. 10, that is, in the case of the construction where the opposing angle A of each outer magnetic pole portion with reference to the magnet is "15.52°", "X" becomes "0.192" and "Y" becomes "0.69", as described above. This construction satisfies the condition of "Y>−0.3X+0.72" and the stable position of the magnet becomes a position at which a boundary between the poles of the magnetized portion opposes the center of the outer magnetic pole portion.

In this embodiment, the sizes have been set so that the condition of "Y<−0.3X+0.63" holds true. Under a state where the energization of the coil 2 is not performed, the aforementioned points E1 and E2 shown in FIG. 5 become a position at which the center of a pole of the rotor 1 opposes the center of the outer magnetic pole portion 3a of the stator 3 and the center of the pole of the rotor 1 stably stays at the position opposing the center of the outer magnetic pole portion 3a.

Even if the energization of the coil 2 is performed and the outer magnetic pole portion 3a is excited under the state where the center of a pole of the rotor 1 opposes the center of the outer magnetic pole portion 3a, however, a force is equally applied in both rotation directions, so that no rotation force occurs in the rotor 1.

Therefore, in this embodiment, a relation between the guide groove 5e of the ground board 5 and the drive pin 1h of the rotor 1 is set in a manner described below, thereby preventing the rotor 1 from rotating to the position at which the center of a pole of the rotor 1 opposes the center of the outer magnetic pole portion 3a.

As shown in FIG. 3, a setting has been made so that when the drive pin 1h is abutted against one end surface of the guide groove 5e, an angle between a pole of the magnet portion of the rotor 1, that is, the center Q1 of the magnetized portion 1b and the center R1 of the outer magnetic pole portion 3a of the stator 3 becomes α° (≠0°). When the coil 2 is energized and the outer magnetic pole portion 3a is excited in the S pole under the state shown in FIG. 3, a rotation force in the clockwise direction is generated to the rotor 1 and there is obtained the state shown in FIG. 4 in which the opening is opened.

Also, when the state in FIG. 3 is applied to FIG. 5, this state corresponds to a position designated by point G. The cogging torque at this position (attraction force occurring in a space with the stator 3 and acting on the rotor 1) becomes T2, which results in a situation where a negative force (force in the counterclockwise direction in FIG. 3) is applied in a rotation direction in which the rotor 1 is returned to the point E1. That is, the maintaining force of the magnet portion of the rotor 1 at the position, at which the drive pin 1h of the rotor 1 is abutted against one end surface of the guide groove 5e of the ground board 5, becomes "T2". As a result, even if the energization of the coil 2 is terminated under the state shown in FIG. 3, the magnet portion of the rotor 1 stays at this position (position in FIG. 3) with stability.

In a like manner, as to the rotation of the rotor 1 in the clockwise direction, a setting has been made so that when the drive pin 1h is abutted against the other end surface of the guide groove 5e, an angle between a pole of the magnet portion of the rotor 1, that is, the center Q2 of the magnetized portion 1b and the center R1 of the outer magnetic pole portion 3a of the stator 3 becomes β° (≠0°). Like in FIG. 3, even if the energization is terminated under the state shown in FIG. 4 in which the opening is opened, the rotor 1 stays at this position (position in FIG. 4) with stability.

When the state in FIG. 4 is applied to FIG. 5, this state corresponds to a position designated by point H. The cogging torque at this position (attraction force occurring in a space with the stator 3 and acting on the rotor 1) becomes "T1", which results in a situation where a positive force (force in the clockwise direction in FIG. 4) is applied in a rotation direction in which the rotor 1 is moved to the point E2. That is, the maintaining force at the position, at which the drive pin 1h of the rotor 1 is abutted against the other end surface of the guide groove 5e of the ground board 5, becomes "T1". As a result, at the time of non-energization of the coil 2, the rotor 1 stays at this position (position in FIG. 4) with stability. A setting has been made so that the rotor 1 makes a rotation of θ° between the state in FIG. 3 and the state in FIG. 4.

When the coil 2 is energized in the reverse direction under the state shown in FIG. 4 and the outer magnetic pole portion 3a of the stator 3 is excited in the N pole, a rotation force in the counterclockwise direction is generated to the magnet portion of the rotor 1 and there is obtained the state shown in FIG. 3 in which the opening is closed. Once the state shown in FIG. 3 is obtained, even if the energization of the coil 2 is terminated, this state is maintained as it is, as described above.

As described above, by switching the direction of the energization of the coil 2, the magnet portion of the rotor 1 is switched from the state in FIG. 3 to the state in FIG. 4 or is switched from the state in FIG. 4 to the state in FIG. 3.

Also, as described above, the shape of the outer magnetic pole portion is set so as to satisfy the condition described above and the rotation angle of the rotor 1 is set so as to include a range in which the cogging force acting on the magnet portion of the rotor 1 is exerted in a reverse direction and not to contain a range in which the center position of each magnetized portion of the rotor opposes the center position of the outer magnetic pole portion. As a result of these settings, there is obtained a one-phase drive apparatus with which it is possible to maintain the rotor 1 at the two stoppage positions under a non-energization state.

The shutter blades 7 and 8 rotate in an interlocked manner with the rotor 1. As described above, when the magnet portion of the rotor 1 is placed under the state in FIG. 4, the shutter blades 7 and 8 each exist at a position away from the opening portion 5b of the ground board 5. On the other hand, when the magnet portion of the rotor 1 is placed under the state shown in FIG. 3, the opening portion 5b of the ground board 5 is closed by the shutter blades 7 and 8. As a result, by switching the direction of energization of the coil 2, it becomes possible to perform control so that the shutter blades 7 and 8 are each set at the open position or the close position, which makes it possible to control the quantity of light passing through the opening portion 6a of the ground board 6 and the opening portion 5b of the ground board 5.

Further, at the time of non-energization of the coil 2, the positions of the shutter blades 7 and 8 are maintained by the attraction force generated by the magnet portion of the rotor 1 and the magnetic pole portions. As a result, even if energization is not performed, there is prevented a situation where the positions of the shutter blades 7 and 8 change due to a vibration or the like, which achieves improvement in reliability of a shutter and realizes power saving.

As a result, the light quantity adjusting apparatus in this embodiment functions as a shutter apparatus or a diaphragm apparatus that are capable of stably maintaining a shutter at each of the open position and the close position without performing energization. In this embodiment, the outer magnetic pole portion is solely provided to form a single tooth, although a plurality of teeth may be provided in a manner to be described later.

(Second Embodiment)

Figure 12:
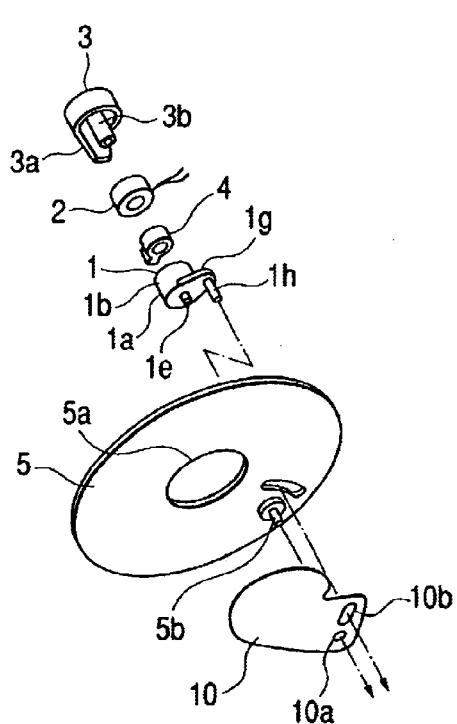
FIG. 12 is a disassembled perspective view of a light quantity adjusting apparatus according to a second embodiment of the present invention.

FIG. 12 shows a light quantity adjusting apparatus according to a second embodiment of the present invention that is an example in which a diaphragm member that adjusts the quantity of light incident on an image pickup element is driven instead of the shutter blades shown in FIGS. 1 to 4. In more detail, there will be described a light quantity adjusting apparatus having a function of driving an ND filter plate using the rotor 1 and adjusting the quantity of passing-through light by moving the ND filter plate to a position covering an opening and to a position away from the opening. The same portions as in FIG. 1 (also regarding the shapes and materials thereof) are given the same reference numerals.

In this drawing, reference numeral 10 denotes an ND filter plate that is a light quantity adjusting means, with the protrusion 5b of the ground board 5 being rotatively fitted into a hole 10a of this ND filter plate 10. Reference numeral 10b indicates a long hole provided for the ND filter plate 10, with the drive pin 1h of the rotor 1 being slidably fitted into the long hole 10b, like in the case of the shutter blades 8 and 9 in the aforementioned first embodiment. When the drive pin 1h of the rotor 1 is rotated, the ND filter plate 10 is moved to a position, at which this ND filter plate 10 closes the opening portion 5a of the ground board 5 and reduces the amount of passing-through light, and to a position at which the ND filter plate 10 is positioned away from the opening portion 5a. With this construction, there is adjusted the quantity of light passing through the opening portion 5a.

Needless to say, instead of this ND filter plate 10, an opening adjusting plate having an opening portion with a small aperture may be moved with reference to the opening portion 5a.

(Third Embodiment)

Figure 13:
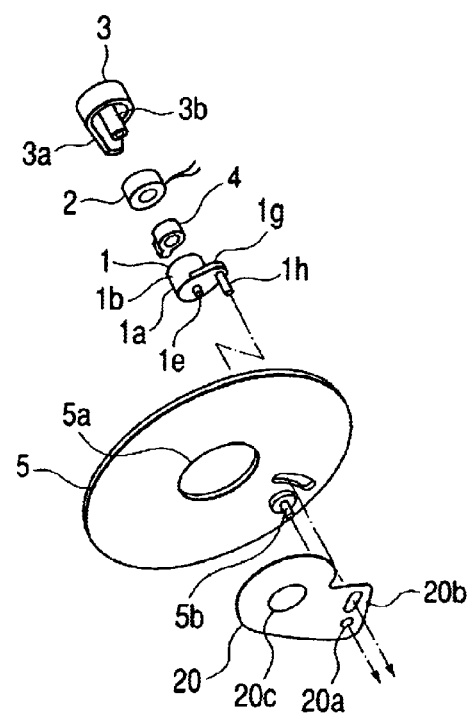
FIG. 13 is a disassembled perspective view of a light quantity adjusting apparatus according to a third embodiment of the present invention.

FIG. 13 shows a light quantity adjusting apparatus according to a third embodiment of the present invention, with the same portions as in FIG. 1 (also regarding the shapes and materials thereof) are given the same reference numerals.

In this drawing, reference numeral 20 denotes a diaphragm aperture plate that is produced with a lightproof plastic or metal, with the protrusion 5b of the ground board 5 being rotatively fitted into a hole portion 20a of this diaphragm aperture plate 20. Reference numeral 20c represents an opening portion whose aperture is smaller than that of the opening portion 5a of the ground board 5, with each portion other than this opening portion being produced using a lightproof material. Like the ND filter plate 10 in the aforementioned second embodiment, the diaphragm aperture plate 20 has a long hole 20b into which the drive pin 1h of the rotor 1 is slidably fitted. Also, this diaphragm aperture plate 20 is capable of moving to a position, at which this plate covers the opening portion 5a of the ground board 5 and reduces the diameter of the opening portion 5a, and to a position, at which this plate is positioned away from the opening portion 5a, depending on the rotation position of the drive pin 1h of the rotor 1. As a result, the diaphragm aperture plate 20 adjusts the quantity of light passing through the opening portion 5a. With this method, even if the energization is terminated under a position state where the quantity of light is adjusted, it becomes possible to maintain this state.

Like in the first embodiment, the number of poles of the magnet portion is set at four in the second and third embodiments described above, although no limitation is imposed on this number of poles.

Figure 14:
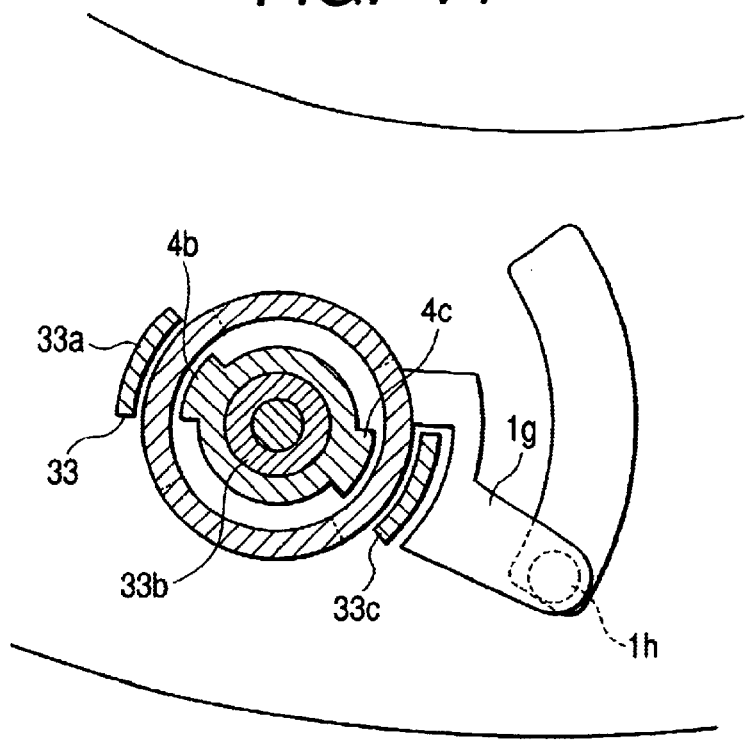
FIG. 14 is a cross-sectional view of the light quantity adjusting apparatus according to the third embodiment of the present invention.

Also, in each embodiment described above, only one outer magnetic pole portion is provided, although it is possible to provide a plurality of magnetic pole portions whose number is equal to or less than half of the number of magnetic poles of the magnet. That is, the magnet is magnetized to have four poles, so that there may be provided a plurality of outer magnetic pole portions whose number is "2" that is half of the number of magnetic poles. In this case, by setting the rotation center of the rotor 1 as a center, the outer magnetic pole portions are disposed around this center so as to be shifted from each other by an integer multiple of "720/n°" (n is the number of magnetic poles and is set at "4" in each embodiment described above). A cross-sectional plan view in this case is shown in FIG. 14. When the number of magnetic poles is set at "8", for instance, four, three, or two outer magnetic pole portions may be provided so as to be separated from each other by an integer multiple of "720/8°" (90° or 180°, for instance).

In FIG. 14, reference numeral 33 denotes a stator. In this drawing, the number of magnetic poles of the magnet is set at "4", so that two outer magnetic pole portions 33a and 33c are provided so as to be separated from each other by 180°. Reference numeral 33b represents an inner cylinder.

Like in each embodiment described above, the outer magnetic pole portions 33a and 33c have a tooth shape that protrudes and extends in a direction parallel to the axis direction of the magnet portion of the rotor 1. In this case, there exist a plurality of outer magnetic pole portions, so that a comb-tooth shape is obtained. When the number of magnetic poles is referred to as "n", the outer magnetic pole portions 33a and 33c of the stator 33 are formed so that their phases are shifted by "720/n°". The number of magnetic poles n of the magnet is set at "4", so that the phases are shifted by 180°. In the external diameter portion of the auxiliary stator 4, opposing portions 4b and 4c are formed in phases opposing the outer magnetic pole portions 33a and 33c of the stator 33.

(Fourth Embodiment)

Figure 15:
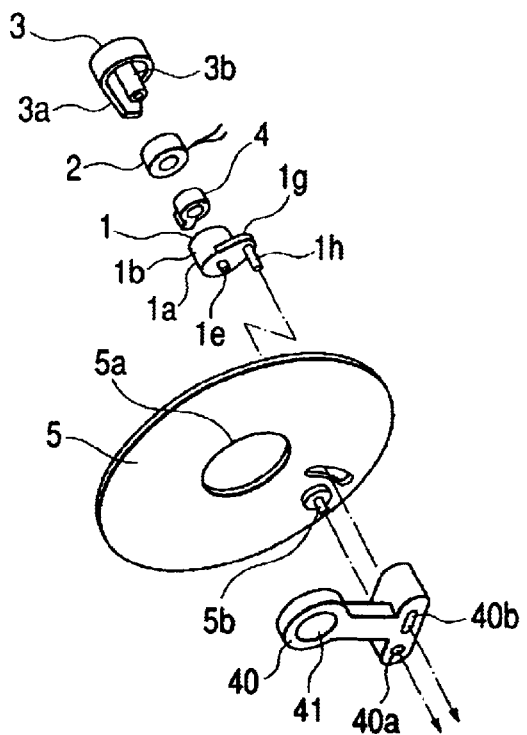
FIG. 15 is a perspective view of a lens drive apparatus according to a fourth embodiment of the present invention.
Figure 16:
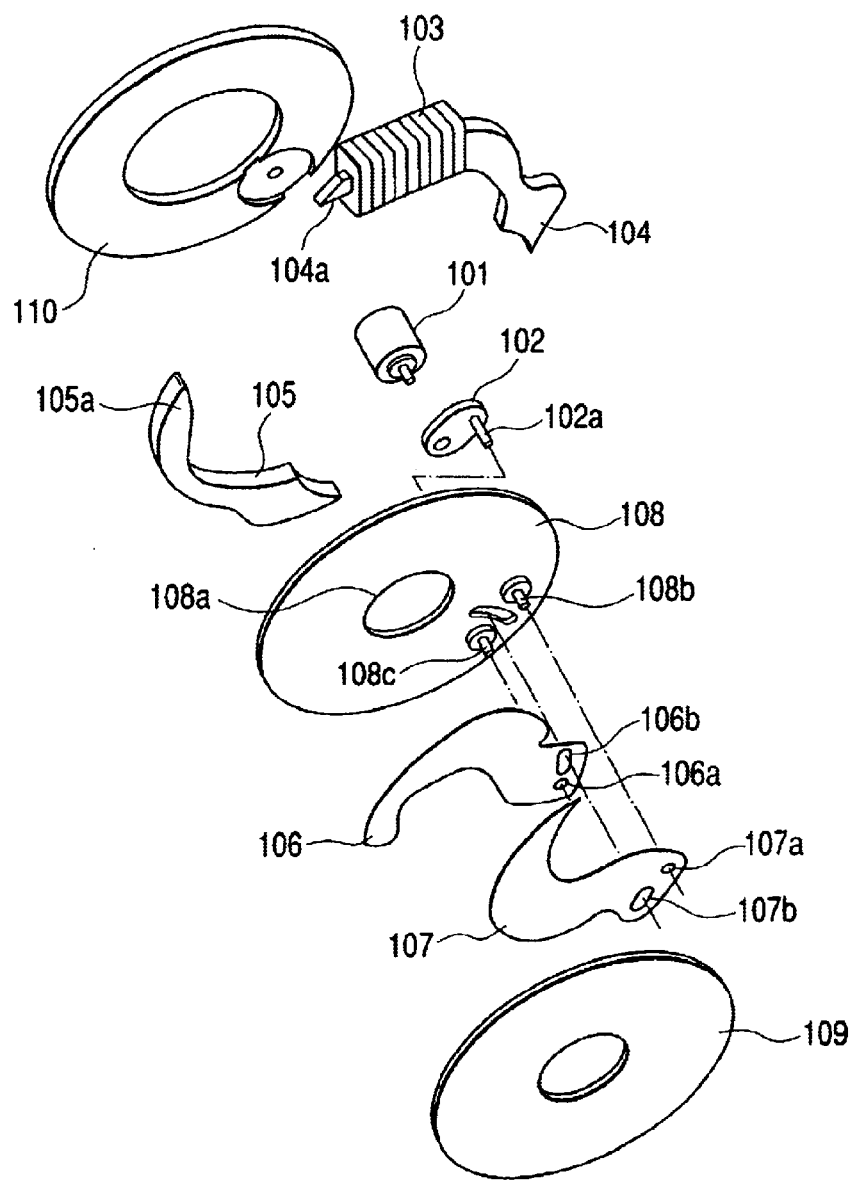
FIG. 16 shows a conventional shutter blade drive apparatus.
Figure 17:
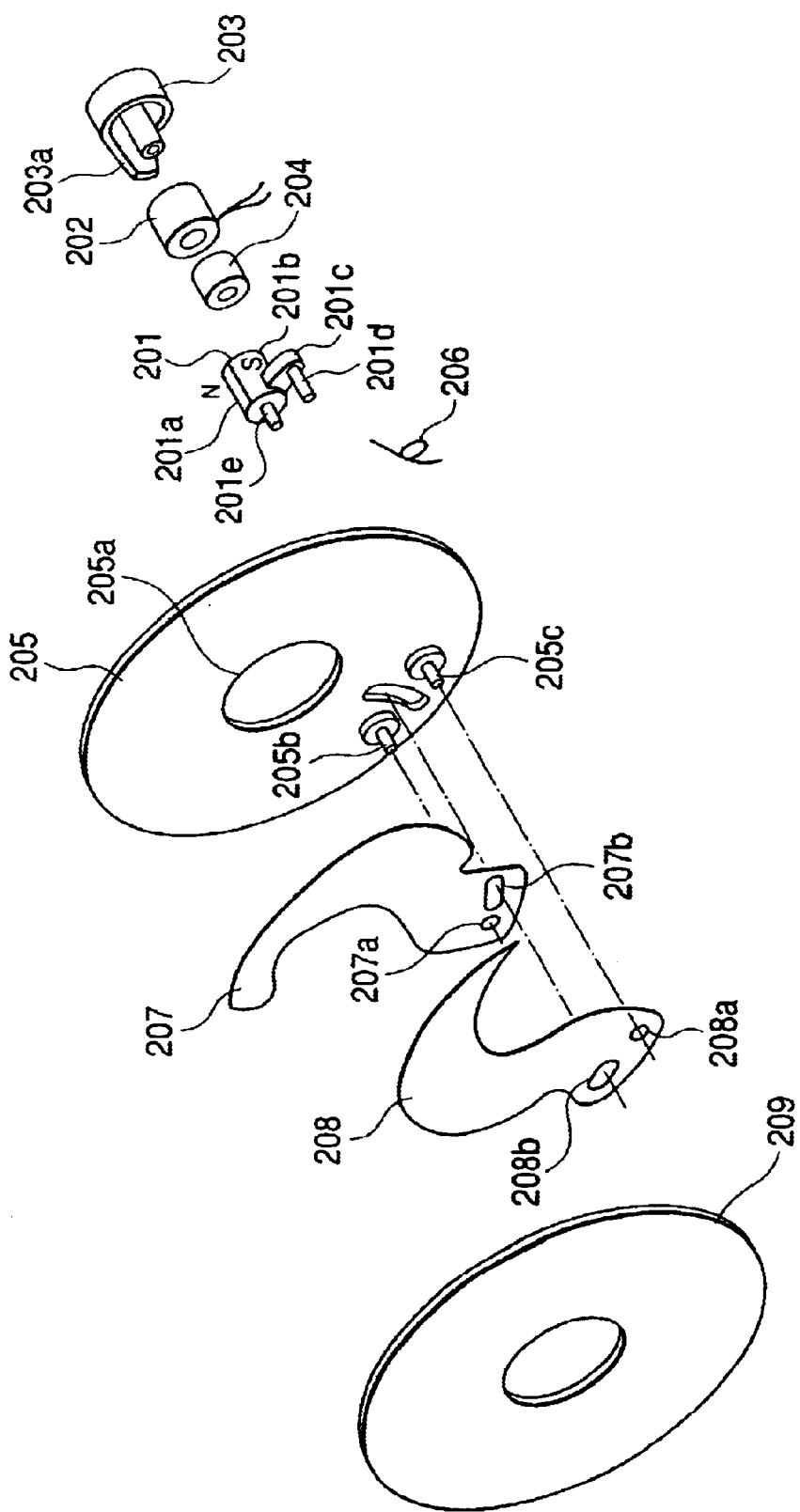
FIG. 17 shows another conventional shutter blade drive apparatus.

FIG. 15 shows a lens drive apparatus according to the fourth embodiment of the present invention, with the same portions as in FIG. 1 (also regarding the shapes and materials thereof) are given the same reference numerals.

In each embodiment described above, shutter blades or a diaphragm member are/is driven. Needless to say, however, there may be obtained a construction where another member is driven. The lens drive apparatus shown in FIG. 15 drives a lens instead of the shutter blades or the diaphragm member of the aforementioned light quantity adjusting apparatus.

In FIG. 15, reference numeral 40 denotes a lens holder, while reference numeral 41 represents a lens attached to this lens holder 40. The lens holder 40 is provided with a hole portion 40a into which the protrusion 5b of the ground board 5 is rotatively fitted. Reference numeral 40b indicates a long hole provided for the lens holder 40. Like in the case of the shutter blades 8 and 9 in the aforementioned first embodiment, the drive pin 1h of the rotor 1 is slidably fitted into the long hole 40b and the lens holder 40 moves the lens 41 to a position covering the opening portion 5a of the ground board 5 or to a position away from the opening portion 5a, depending on the rotation position of the drive pin 1h of the rotor 1. As a result, there is adjusted the focal point of light passing through the opening portion 5a.

The rotor 1, the coil 2, the stator 3, and the auxiliary stator 4 each have the same construction as in the aforementioned first embodiment, so that at the time of non-energization of the coil 2, the position of the lens is maintained by the attraction force generated by the magnet portion and the rotor 1 and the magnetic pole portions. As a result, even if the energization is not performed, the position of the lens 31 does not vary due to a vibration or the like, which improves the reliability of the lens drive apparatus and achieves energy saving.

Effects in the first to fourth embodiments described above will be collectively enumerated below while explicitly showing correspondences with the construction elements.

According to the present invention, there is provided a drive apparatus for maintaining a rotor 1 at two stoppage positions, including: a rotor 1 that has a magnet portion having a cylindrical shape whose outer peripheral surface is circumferentially divided into sections that are magnetized to have different poles, and is capable of rotating about an axis; at least one outer magnetic pole portion 3a (33a, 33c) that is formed so as to protrude and extend parallel to the axis and opposes the outer peripheral surface of the magnet portion; an inner magnetic pole portion (3b, 4b, 4c, 33b) disposed at a position opposing the outer magnetic pole portion 3a (33a, 33c) so as to oppose an inner peripheral surface of the magnet portion; and a coil 2 that is disposed in an axis direction of the rotor and excites the outer magnetic pole portion 3a (33a, 33c) and the inner magnetic pole portion (3b, 4b, 4c, 33b), in which when a value of a ratio of a central angle of the outer magnetic pole portion 3a (33a, 33c) to a central angle of each magnetized pole of the magnet portion is referred to as Y, and a value of a ratio of a thickness of the magnet portion in a diameter direction to a circumferential length of each magnetized pole of the magnet portion is referred to as X, the following condition is satisfied:

$$-0.3X+0.63>Y.$$

Further, according to the present invention, there is provided a light quantity adjusting apparatus for maintaining a light quantity adjusting member at two stoppage positions, including: a rotor 1 that has a magnet portion having a cylindrical shape whose outer peripheral surface is circumferentially divided into sections that are magnetized to have different poles, and is capable of rotating about an axis; an output member 1h that operates in accordance with rotation of the rotor; at least one outer magnetic pole portion 3a (33a, 33c) that is formed so as to protrude and extend parallel to the axis and opposes the outer peripheral surface of the magnet portion; an inner magnetic pole portion (3b, 4b, 4c, 33b) disposed at a position opposing the outer magnetic pole portion 3a (33a, 33c) so as to oppose an inner peripheral surface of the magnet portion; a coil 2 that is disposed in an axis direction of the rotor and excites the outer magnetic pole portion 3a (33a, 33c) and the inner magnetic pole portion (3b, 4b, 4c, 33b); a ground board 5 provided with an opening portion 5a; and a light quantity adjusting member (7, 8, 10, 20) that is driven by the output member 1h so as to move between a position closing the opening portion 5a of the ground board 5 and a position away from the opening portion 5a, and changes a light quantity passing through the opening portion 5a, in which when a value of a ratio of a central angle of the outer magnetic pole portion (33a, 33c) to a central angle of each magnetized pole of the magnet portion is referred to as Y, and a value of a ratio of a thickness of the magnet portion in a diameter direction to a circumferential length of each magnetized pole of the magnet portion is referred to as X, the following condition is satisfied:

$$-0.3X+0.63>Y.$$

Further, according to the present invention, there is provided a lens drive apparatus for maintaining a lens 41 at two stoppage positions, including: a rotor 1 that has a magnet portion having a cylindrical shape whose outer peripheral surface is circumferentially divided into sections that are magnetized to have different poles, and is capable of rotating about an axis; an output member 1h that operates in accordance with rotation of the rotor; at least one outer magnetic pole portion 3a (33a, 33c) that is formed so as to protrude and extend parallel to the axis and opposes the outer peripheral surface of the magnet portion; an inner magnetic pole portion (3b, 4b, 4c, 33b) disposed at a position opposing the outer magnetic pole portion 3a (33a, 33c) so as to oppose an inner peripheral surface of the magnet portion; a coil 2 that is disposed in an axis direction of the rotor and excites the outer magnetic pole portion 3a (33a, 33c) and the inner magnetic pole portion (3b, 4b, 4c, 33b); a ground board 5 provided with an opening portion 5a; and a lens 41 that is driven by the output member so as to move between a position closing the opening portion 5a of the ground board 5 and a position away from the opening portion 5a, and changes a focal length of a luminous flux passing through the opening portion 5a, in which when a value of a ratio of a central angle of the outer magnetic pole portion (33a, 33c) to a central angle of each magnetized pole of the magnet portion is referred to as Y, and a value of a ratio of a thickness of the magnet portion in a diameter direction to a circumferential length of each magnetized pole of the magnet portion is referred to as X, the following condition is satisfied:

$$-0.3X+0.63>Y.$$

With these constructions, a cogging force is exerted so that the center position of a magnetized pole of the magnet portion opposes the center position of the outer magnetic pole portion 3a. The outer peripheral surface of the magnet is divided into several sections that are magnetized to have different poles (the N pole and the S pole), so that it becomes possible to maintain the rotation position of the rotor at either of the two positions at the time of non-energization of the coil.

In more detail, when there is performed the energization of the coil 2, driving is performed so that the center position of a magnetized pole of the magnet portion moves with reference to the position opposing the center of the tooth-shaped outer magnetic pole portion 3a. Consequently, even if the energization of the coil 2 is terminated, the magnet portion (rotor 1) driven through the energization of the coil 2 is attracted by a magnetic force (cogging force) occurring in the stator so that its position is maintained. That is, even during non-energization, it is possible to maintain the rotation position of the rotor, which makes it possible to reduce power consumption.

Also, in the aforementioned embodiments, the operating range of the rotor 1 is regulated so as to contain a range, in which an attraction force due to a magnetic force acting between the magnet portion of the rotor 1 and the outer magnetic pole portion 3a is exerted in a reverse direction, and not to contain a range in which the center of a magnetized pole of the magnet portion opposes the center of the outer magnetic pole portion 3a.

When the energization of the coil 2 is performed and the outer magnetic pole portion 3a is excited in the S pole under the state shown in FIG. 3, a clockwise rotation force is generated to the magnet portion and activation is performed with stability, so that there is obtained the open state in FIG. 4. Also, when the energization of the coil 2 is performed and the outer magnetic pole portion 3a is excited in the N pole under the state shown in FIG. 4, a counterclockwise rotation force is generated to the magnet portion and activation is performed with stability, so that there is obtained the close state shown in FIG. 3.

Also, in the aforementioned embodiments, the operating range of the output member 1h is disposed at a position separated from the outer magnetic pole portion 3a, so that even if the drive pin 1h is produced using a magnet material, the electromagnetic force occurring in the drive pin portion is extremely small. As a result, it becomes possible to prevent a situation where an influence is exerted on the overall output characteristic of the magnet, which makes it possible to obtain a stable drive characteristic.

Further, in the aforementioned embodiments, one end 1e of an axis that is the rotation center of the rotor 1 is rotatively fitted into the hole portion 5d formed in an area of the front ground board 5 outside of the opening portion 5a of the ground board 5, and the other end 1f thereof is rotatively fitted into a hole portion provided in the center portion of the inner magnetic pole portion 3b. As a result, it becomes easy to manage the gaps between the inner magnetic pole portion 3b and the magnet portion and between the outer magnetic pole portion 3a and the magnet portion, which stabilizes performance at the time of mass production.

What is claimed is:

1. A drive apparatus comprising:
   a rotor that has a magnet portion having a cylindrical shape whose outer peripheral surface is circumferentially divided into sections that are magnetized to have different poles, and is capable of rotating about an axis;
   at least one outer magnetic pole portion that is formed so as to protrude and extend parallel to the axis and opposes the outer peripheral surface of the magnet portion;
   an inner magnetic pole portion disposed at a position opposing the outer magnetic pole portion so as to oppose an inner peripheral surface of the magnet portion; and
   a coil that is disposed in an axis direction of the rotor and excites the outer magnetic pole portion and the inner magnetic pole portion,
   wherein the rotor is maintained at two stoppage positions, and when a value of a ratio of a central angle of the outer magnetic pole portion to a central angle of each magnetized pole of the magnet portion is referred to as Y, and a value of a ratio of a thickness of the magnet portion in a diameter direction to a circumferential length of each magnetized pole of the magnet portion is referred to as X, the following condition is satisfied:

$-0.3X+0.63>Y.$

2. A drive apparatus according to claim 1, further comprising a regulating member,
   wherein the regulating member regulates an operating range of the rotor so that the operating range contains a range, in which an attraction force due to a magnetic force acting between the magnet portion of the rotor and the outer magnetic pole portion is exerted in a reverse direction, and not to contain a range in which the center of a magnetized pole of the magnet portion opposes the center of the outer magnetic pole portion.

3. A light quantity adjusting comprising:
   a rotor that has a magnet portion having a cylindrical shape whose outer peripheral surface is circumferentially divided into sections that are magnetized to have different poles, and is capable of rotating about an axis;
   an output member that operates in accordance with rotation of the rotor;
   at least one outer magnetic pole portion that is formed so as to protrude and extend parallel to the axis and opposes the outer peripheral surface of the magnet portion;
   an inner magnetic pole portion disposed at a position opposing the outer magnetic pole portion so as to oppose an inner peripheral surface of the magnet portion;
   a coil that is disposed in an axis direction of the rotor and excites the outer magnetic pole portion and the inner magnetic pole portion;
   a ground board provided with an opening portion; and
   a light quantity adjusting member that is driven by the output member so as to move between a position closing the opening portion of the ground board and a position away from the opening portion, and changes a light quantity passing through the opening portion,
   wherein the light quantity adjusting member is maintained at two stoppage positions, and when a value of a ratio of a central angle of the outer magnetic pole portion to a central angle of each magnetized pole of the magnet portion is referred to as Y, and a value of a ratio of a thickness of the magnet portion in a diameter direction to a circumferential length of each magnetized pole of the magnet portion is referred to as X, the following condition is satisfied:

$-0.3X+0.63>Y.$

4. A light quantity adjusting apparatus according to claim 3,
   wherein the ground board is provided with a guide groove into which the output member is fitted and which regulates an operating range of the output member,
   wherein the guide groove is formed so that the operating range contains a range, in which an attraction force due to a magnetic force acting between the magnet portion of the rotor and the outer magnetic pole portion is exerted in a reverse direction, and does not contain a range in which a center of a magnetized pole of the magnet portion opposes a center of the outer magnetic pole portion.

5. A light quantity adjusting apparatus according to claim 4,
   wherein the light quantity adjusting member is a shutter blade,
   wherein when the output member is abutted against one end surface of the guide groove, the shutter blade sets the opening portion in an open state, and
   when the output member is abutted against the other end surface of the guide groove, the shutter blade sets the opening portion in a close state.

6. A light quantity adjusting apparatus according to claim 4,
   wherein the light quantity adjusting member is a diaphragm member,
   wherein when the output member is abutted against one end surface of the guide groove, the diaphragm member is moved to a position closing the opening portion and reduces a quantity of light passing through the opening portion, and when the output member is abutted against the other end surface of the guide groove, the diaphragm member is moved away from the opening portion.

7. A light quantity adjusting apparatus according to claim 4, wherein the operating range of the output member is positioned on a side opposite to the outer magnetic pole portion with the rotor in-between.

8. A light quantity adjusting apparatus according to claim 3, wherein the output member is formed and rotated integrally with the magnet portion, and a position of the outer magnetic pole portion and a position of the output member overlap each other in an axis direction of the rotor.

9. A light quantity adjusting apparatus according to claim 3, wherein one end of an axis that is a rotation center of the rotor is rotatively fitted into a hole portion provided for the ground board in an area outside of the opening portion of the ground board, and the other end thereof is rotatively fitted to a hole portion provided in a center portion of the inner magnetic pole portion.

10. A lens drive apparatus comprising:

a rotor that has a magnet portion having a cylindrical shape whose outer peripheral surface is circumferentially divided into sections that are magnetized to have different poles, and is capable of rotating about an axis;

an output member that operates in accordance with rotation of the rotor;

at least one outer magnetic pole portion that is formed so as to protrude and extend parallel to the axis and opposes the outer peripheral surface of the magnet portion;

an inner magnetic pole portion disposed at a position opposing the outer magnetic pole portion so as to oppose an inner peripheral surface of the magnet portion;

a coil that is disposed in an axis direction of the rotor and excites the outer magnetic pole portion and the inner magnetic pole portion;

a ground board provided with an opening portion; and a lens that is driven by the output member so as to move between a position closing the opening portion of the ground board and a position away from the opening portion, and changes a focal length of a luminous flux passing through the opening portion, wherein the lens is maintained at two stoppage positions, and when a value of a ratio of a central angle of the outer magnetic pole portion to a central angle of each magnetized pole of the magnet portion is referred to as Y, and a value of a ratio of a thickness of the magnet portion in a diameter direction to a circumferential length of each magnetized pole of the magnet portion is referred to as X, the following condition is satisfied:

$$-0.3X+0.63>Y.$$

11. A lens drive apparatus according to claim 10, wherein the ground board is provided with a guide groove into which the output member is fitted and which regulates an operating range of the output member, wherein the guide groove is formed so that the operating range contains a range, in which an attraction force due to a magnetic force acting between the magnet portion of the rotor and the outer magnetic pole portion is exerted in a reverse direction, and does not contain a range in which a center of a magnetized pole of the magnet portion opposes a center of the outer magnetic pole portion.

* * * * *